(12) United States Patent
Tsukamoto

(10) Patent No.: US 8,076,022 B1
(45) Date of Patent: Dec. 13, 2011

(54) BATTERY COVER HAVING ONE OR MORE QUENCHING MEDIA

(75) Inventor: Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 716 days.

(21) Appl. No.: 11/784,727

(22) Filed: Apr. 9, 2007

(51) Int. Cl.
*H01M 2/00* (2006.01)

(52) U.S. Cl. ......... 429/163; 429/120; 429/166; 429/175

(58) Field of Classification Search ........................ None
See application file for complete search history.

(56) References Cited

U.S. PATENT DOCUMENTS

| | | | |
|---|---|---|---|
| 2,901,526 A | 8/1959 | Alton et al. | |
| 3,487,299 A | 12/1969 | Rosacker et al. | |
| 3,769,095 A | 10/1973 | Schmidt | |
| 4,255,782 A | 3/1981 | Joyce | |
| 4,916,034 A | 4/1990 | Hulsebus et al. | |
| 4,957,829 A | 9/1990 | Holl | |
| 5,017,441 A | 5/1991 | Lindner | |
| 5,140,744 A | 8/1992 | Miller | |
| 5,218,284 A | 6/1993 | Burns et al. | |
| 5,298,341 A | 3/1994 | Khandkar et al. | |
| 5,302,110 A | 4/1994 | Desai et al. | |
| 5,378,555 A | 1/1995 | Waters et al. | |
| 5,422,558 A | 6/1995 | Stewart | |
| 5,437,939 A | 8/1995 | Beckley | |
| 5,449,571 A * | 9/1995 | Longardner et al. | 429/120 |
| 5,504,415 A | 4/1996 | Podrazhansky et al. | |
| 5,516,603 A | 5/1996 | Holcombe | |
| 5,534,765 A | 7/1996 | Kreisinger et al. | |
| 5,539,297 A | 7/1996 | Fiebig | |
| 5,567,544 A | 10/1996 | Lyman | |
| 5,596,567 A | 1/1997 | deMuro et al. | |
| 5,639,571 A | 6/1997 | Waters et al. | |
| 5,641,587 A | 6/1997 | Mitchell et al. | |
| 5,652,499 A | 7/1997 | Morita et al. | |
| 5,709,280 A | 1/1998 | Beckley et al. | |
| 5,736,272 A | 4/1998 | Vennstra et al. | |
| 5,851,695 A | 12/1998 | Misra et al. | |
| 5,969,503 A | 10/1999 | Davis et al. | |
| 6,002,240 A | 12/1999 | McMahan et al. | |
| 6,094,034 A | 7/2000 | Matsuura | |
| 6,140,927 A | 10/2000 | Whitmire | |
| 6,373,222 B2 | 4/2002 | Odaohhara | |
| 6,377,432 B1 | 4/2002 | Hashimoto | |
| 6,420,851 B1 | 7/2002 | Schoofs et al. | |
| 6,462,551 B1 | 10/2002 | Coates et al. | |

(Continued)

FOREIGN PATENT DOCUMENTS

EP 1460698 A1 9/2004

*Primary Examiner* — Melvin Mayes
*Assistant Examiner* — Smita Patel
(74) *Attorney, Agent, or Firm* — Gevrilonick Dodd & Lindsey, LLP

(57) ABSTRACT

A battery includes a case having an interior holding an electrolyte activating one or more anodes and one or more cathodes. A cover is positioned on the case. The cover includes one or more quenching media that each has a phase transition that occurs at a temperature above a failure temperature of the battery and below a failure temperature of the battery. The failure temperature is the temperature at which a chain reaction associated with thermal runaway is initiated. The failure temperature of the battery is the temperature of the battery at which the thermal runaway causes failure of the battery.

16 Claims, 5 Drawing Sheets

U.S. PATENT DOCUMENTS

| | | |
|---|---|---|
| 6,465,986 B1 | 10/2002 | Haba |
| 6,479,927 B1 | 11/2002 | Hiderbrand |
| 6,524,739 B1 | 2/2003 | Iwaizono et al. |
| 6,544,682 B1 * | 4/2003 | Takami et al. ............... 429/62 |
| 6,565,986 B2 | 5/2003 | Itoh |
| 6,586,132 B1 | 7/2003 | Fukuda et al. |
| 6,600,641 B2 | 7/2003 | Oglesbee et al. |
| 6,639,408 B2 | 10/2003 | Yudahira et al. |
| 6,781,343 B1 | 8/2004 | Demachi et al. |
| 6,882,061 B1 | 4/2005 | Ashtiani et al. |
| 6,980,859 B2 | 12/2005 | Powers et al. |
| 7,553,583 B2 | 6/2009 | Eaves |
| 7,573,233 B1 | 8/2009 | Chow et al. |
| 7,573,234 B1 | 8/2009 | Tsukamoto |
| 2002/0070710 A1 | 6/2002 | Yagi et al. |
| 2002/0183801 A1 | 12/2002 | Howard et al. |
| 2003/0013009 A1 | 1/2003 | Dansui et al. |
| 2003/0042870 A1 | 3/2003 | Yau et al. |
| 2003/0129457 A1 | 7/2003 | Kawai et al. |
| 2003/0152830 A1 | 8/2003 | Eaves |
| 2003/0186116 A1 | 10/2003 | Tanjou |
| 2004/0018419 A1 | 1/2004 | Sugimoto et al. |
| 2004/0058233 A1 | 3/2004 | Hamada et al. |
| 2004/0084534 A1 * | 5/2004 | Bhatia et al. ............. 235/472.01 |
| 2004/0095098 A1 | 5/2004 | Turner et al. |
| 2004/0096713 A1 | 5/2004 | Ballantine et al. |
| 2004/0138785 A1 | 7/2004 | Emori et al. |
| 2004/0201365 A1 | 10/2004 | Dasgupta et al. |
| 2004/0253512 A1 | 12/2004 | Watanabe et al. |
| 2005/0007068 A1 | 1/2005 | Johnson et al. |
| 2005/0042505 A1 | 2/2005 | Cooper et al. |
| 2005/0140335 A1 | 6/2005 | Lee et al. |
| 2005/0269995 A1 | 12/2005 | Donnelly et al. |
| 2006/0063066 A1 * | 3/2006 | Choi et al. ................... 429/120 |
| 2006/0076923 A1 | 4/2006 | Eaves |
| 2006/0208692 A1 | 9/2006 | Kejha |
| 2006/0214640 A1 | 9/2006 | Woo et al. |
| 2007/0029124 A1 | 2/2007 | DasGupta et al. |
| 2007/0126400 A1 | 6/2007 | Benckenstein et al. |
| 2008/0063934 A1 | 3/2008 | Bechtold et al. |
| 2009/0280400 A1 | 11/2009 | Tsukamoto |

* cited by examiner

BATTERY COVER HAVING ONE OR MORE QUENCHING MEDIA

FIELD

The present invention relates to electrochemical devices, and more particularly to covers for use with electrochemical devices.

BACKGROUND

A variety of desirable battery construction are associated with a phenomenon known as thermal runaway. Thermal runaway is evident from a rapid rise in the temperature of the battery leading to a potentially catastrophic failure of the battery. The rise in temperature during thermal runaway is believed to result from an uncontrolled chain reaction triggered by an exothermic reaction between the electrolyte and an active material on an anode. Because current battery construction does not adequately address thermal runaway, there is a need for a battery configured to address thermal runaway.

SUMMARY

The battery includes a case having an interior holding an electrolyte activating one or more anodes and one or more cathodes. A cover is positioned on the case. The cover includes one or more quenching media that each has a phase transition that occurs at a temperature above an exothermic reaction temperature of the battery and below a failure temperature of the battery. The exothermic reaction temperature is the temperature at which a chain reaction associated with thermal runaway is initiated. The failure temperature of the battery is the temperature of the battery at which the thermal runaway causes failure of the battery.

BRIEF DESCRIPTION OF THE FIGURES

FIG. 1A is a perspective view of the battery system.

FIG. 1B is a cross-section of the battery system shown in FIG. 1A.

FIG. 1C is a topview of the battery system shown in FIG. 1A taken looking in the direction of the arrow labeled A in FIG. 1A.

FIG. 1D is a cross-section of the battery system taken along a line extending between brackets labeled D in FIG. 1B.

DESCRIPTION

A battery includes a case having an interior holding an electrolyte activating one or more anodes and one or more cathodes. A cover is positioned on the case. The cover includes one or more quenching media that each has a phase transition that occurs at a temperature above an exothermic reaction temperature of the battery and below a failure temperature of the battery. The exothermic reaction temperature is the temperature at which a chain reaction associated with thermal runaway is initiated. The failure temperature of the battery is the temperature of the battery at which the thermal runaway causes failure of the battery. Since the phase transition occurs between the exothermic reaction temperature and the failure temperature, the phase transition occurs before the battery fails. The phase transition require energy from an outside source in order to occur. Since the phase transition occurs before the battery fails, the phase transition of the quenching media absorbs energy from the battery before the battery fails. This absorption of energy can prevent the failure of the battery and/or reduce the catastrophic results that are often associated with this failure.

Figure 1B:
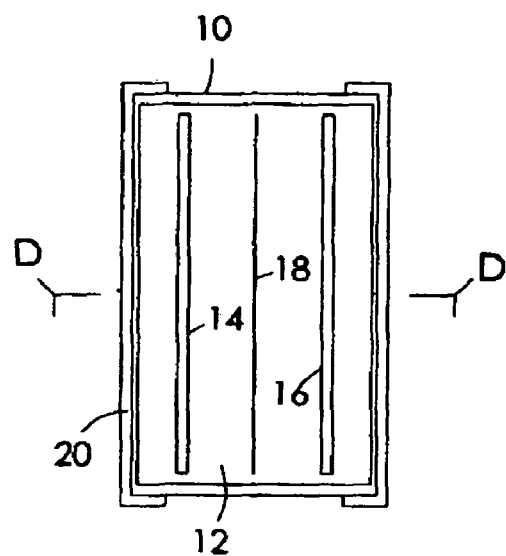
FIG. 1A through FIG. 1D illustrate a battery system having a cover on a battery.
Figure 1A:
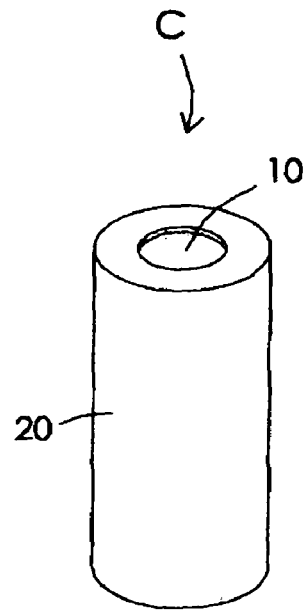
Figure 1C:
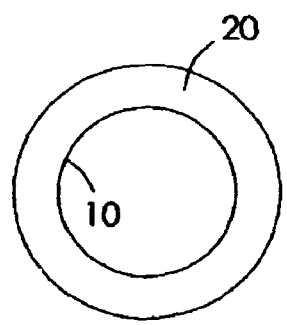
Figure 1D:
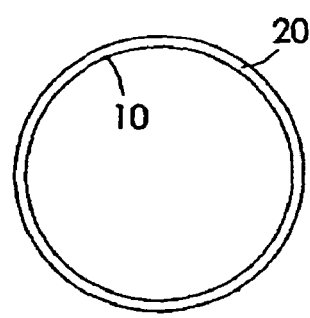

FIG. 1A through FIG. 1D illustrate a battery system having a cover on a battery. FIG. 1A is a perspective view of the battery system. FIG. 1B is a cross-section of the battery system shown in FIG. 1A. FIG. 1C is a topview of the battery system shown in FIG. 1A taken looking in the direction of the arrow labeled A in FIG. 1A. FIG. 1D is a cross-section of the battery system taken along a line extending between brackets labeled D in FIG. 1B. The battery includes a case 10 that houses an electrolyte 12 activating an anode 14 and a cathode 16. A separator 18 is optionally positioned between the anode 14 and the cathode 16. Although the battery is illustrated as including one anode 14 and one cathode 16, the battery can include more than one anode 14 and/or more than one cathode 16 with the anodes 14 and cathodes 16 each separated by a separator 18. The one or more anodes 14 and the one or more cathodes 16 can have a variety of different configurations in the case 10 including, but not limited to, stacked configurations where multiple anodes 14 and multiple cathodes 16 are alternated in a stack, a "jellyroll" configurations, and wound configurations.

The battery can be a primary battery or a secondary battery. The quenching media have proven to be particularly useful in combination with lithium ion batteries. As a result, the one or more anodes 14, one or more cathodes 16 and the electrolyte 12 can have a composition of a lithium ion battery. In one example, the battery includes $LiCoO_2$ as an active material in the cathode, graphite as an active material in the anode, and an electrolyte having $LiPF_6$ dissolved to 1 M in EC/DMC/DEC.

The case 10 can include one or more battery terminals (not shown). At least one terminal is in electrical communication with one or more anodes in the case 10 and at least one terminal is in electrical communication with one or more cathodes in the case 10. In one example, the case 10 is constructed such that a bottom of the case 10 can serve as one battery terminal and a top of the case 10 can serve as another battery terminal. In another embodiment, the case 10 can include one or more pins that extend through a top of the case 10. The pins can each serve as a battery terminal. Other case 10 constructions are also possible. The walls of the case 10 can be constructed of a single layer of material such as a single layer of metal. Alternately, the walls of the case 10 can be constructed with multiple layers of different materials.

A cover 20 is positioned on the case 10. The cover 20 is positioned adjacent to the lateral sides of the case 10. Additionally, the cover 20 covers a portion of each end of the case.

Figure 2A:
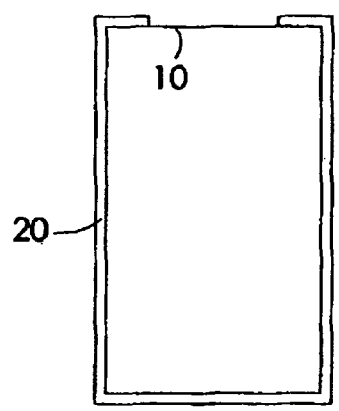
FIG. 2A is a cross-section of a battery system where the entire bottom of the case is covered by the cover.
Figure 2B:
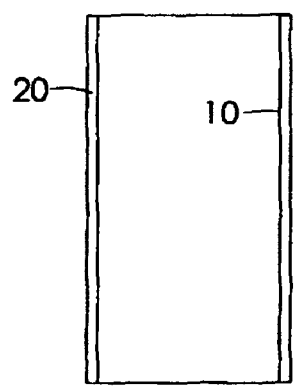
FIG. 2B is a cross-section of a battery system where the cover does not cover any portion of the top of the case and the cover does not cover any portion of the bottom of the case.

For instance, the cover 20 covers a portion of the top of the case 10 and a portion of the bottom of the case 10. In some instances, the cover 20 contacts the lateral sides of the case 10, the top of the case 10, and the bottom of the case 10. Although FIG. 1A through FIG. 1D illustrate the cover 20 covering only a portion of the top of the case 10 and a portion of the bottom of the case 10, the cover 20 can cover the entire top and/or the entire bottom. For instance, FIG. 2A is a cross section of a case 10 where the entire bottom of the case 10 is covered by the cover 20. Additionally, the cover 20 need not cover any portion of the top of the case 10 and/or any portion of the bottom of the case 10. For instance, FIG. 2B is a case 10 where the cover 20 does not cover any portion of the top of the case 10 and the cover 20 does not cover any portion of the bottom of the case 10.

The cover 20 includes or consists of one or more quenching media. Each quenching media has a phase transition that occurs at a temperature above an, exothermic reaction temperature of the battery and below a failure temperature of the battery. The exothermic reaction temperature is the temperature at which thermal runaway begins. The failure temperature of the battery is the temperature of the battery at which thermal runaway causes failure of the battery.

The exothermic reaction temperature and the failure temperature can change depending on the composition of the anodes, cathodes, and electrolytes. A common battery uses $LiCoO_2$ as an active material in the cathode, graphite as an active material in the anode, and $LiPF_6$ dissolved to 1 M in a mixture of ethylene carbonate (EC), dimethyl carbonate (DMC), and diethyl carbonate (DEC) as an electrolyte. Differential scanning calorimetry has been employed to explore the thermal characteristics of these batteries. These batteries show thermal runaway when short-circuit or are exposed to extreme conditions. The thermal runaway mechanism is triggered by an exothermic reaction between the anode active material and electrolyte at around 120° C. A second exothermic reaction involves the cathode active material and the electrolyte at around 180-300° C. A third exothermic reaction comes from the anode active material and electrolyte at around 350° C. The battery fails at about 150-170° C. Accordingly, the one or more quenching media for use with these batteries can have a phase transition at a temperature below 150° C., or between the normal battery operating temperature of 25° C. and the battery failure temperature of 150° C., or between 100° C. and 150° C. Additionally, it is believed that in some instances the thermal runaway of these batteries can be alleviated by either preventing the initial triggering reaction of the anode at-around 120° C. As a result, the one or more quenching media can have a phase transition at a temperature below 120° C., or between the normal battery operating temperature of 25° C. and the exothermic reaction temperature of 120° C. In some instances, it may be possible to alleviate thermal runaway of these batteries by stopping the chain reaction between 120° C. and 180° C. As a result, the one or more quenching media can have a phase transition at a temperature below 180° C., or between the normal battery operating temperature of 25° C. and the battery failure temperature of 180° C.

Many battery compositions have a thermal runaway that occurs at a temperatures above 80° C., 120° C., 180° C. and 350° C. and a failure temperature that occurs at less than 80° C., 120° C., 150° C., or 180° C. Accordingly, the cover 20 includes or consists of one or more quenching media that each has a phase transition that occurs at a temperature above 25° C., 80° C., or 100° C. and/or below 80° C., 120° C., 150° C., 170° C., or 180° C.

Since the phase transition occurs between the exothermic reaction temperature and the failure temperature, the phase transition occurs before the battery fails. It is often desirable for a quenching medium to have a phase transition that is at a temperature that is substantially below the failure temperature of the battery to enable the phase transition to occur before the battery fails. As a result, in some instances, the cover 20 includes at least one quenching medium with a phase transition that occurs at a temperature that is above the exothermic reaction temperature and also less than the exothermic reaction temperature plus 10% of the failure temperature range, less than the exothermic reaction temperature plus 20% of the failure temperature range, or less than the exothermic reaction temperature plus 30% of the failure temperature range. The failure temperature range is the difference between the exothermic reaction temperature and the failure temperature.

Suitable phase transitions include melting, evaporation, and sublimation. Since these phase transitions can quench the thermal runaway of the battery, these phase transitions serve as quenching transitions. The heat of transition provides a measure of the amount of heat absorbed during a phase transition. For instance, heat of evaporation, and heat of sublimation respectively indicate the amount of heat absorbed during evaporation, and sublimation of a quenching medium. The heat of fusion has the opposite sign for the heat required to melt a quenching medium. Accordingly, the heat of fusion multiplied by −1 indicates the amount of heat absorbed during melting (heat of melting). As the heat of transition associated with a quenching transition increases, the amount of energy absorbed by the quenching medium increases. As a result, a higher heat of phase transition is more desirable for battery safety. In general, the heat of sublimation for a substance is higher than the heat of evaporation, which is higher than the heat of fusion. Accordingly, sublimation may be the preferred phase transition.

In some instances, one or more of the quenching media has a quenching transition with a heat of transition greater than 10 J/g at 1 atm, 50 J/g at 1 atm, or 100 J/g at 1 atm. Suitable quenching media include, but are not limited to, parafin, polyethylene, silver nitrate and indium metal.

The exothermic reaction failure temperature for a battery is the onset temperature for exothermic behavior resulting in catastrophic failure of the battery. The exothermic reaction temperature can be determined from the adiabatic self-heating rate of the battery (dT/dt) as determined from accelerated rate calorimetry. The exothermic reaction temperature can be identified as the temperature where a sharp increase in the self-heating rate is associated with catastrophic failure of the battery. Since secondary batteries are generally charged to less than theoretical capacity to promote longer cycle life and higher safety during normal use, the exothermic reaction temperature of the battery can be the exothermic reaction temperature of the battery when the battery is charged to 60% of the theoretical capacity of the limiting electrode. Accordingly, the self-heating rate data can be generated for a battery charged to 60% of the theoretical capacity of the limiting electrode.

As noted above, the cover 20 can consist of the one or more quenching media. Alternately, the cover 20 can include the one or more quenching media in combination with support materials. Support materials include or consist of media that do not have a phase transition between the exothermic reaction temperature and the failure temperature. In some instances, the support excludes media having a phase transition between the exothermic reaction temperature and the failure temperature. In some instances, a polymer or plastic serves as the support. In one example, the support includes or consists of a shrinkwrap material. Suitable shrinkwrap materials include, but are not limited to, polyethylene and polypropylene.

In one example, a cover material includes the one or more quenching media mixed in a polymer or plastic. The cover material can then be bonded to the case such that the cover material serves as the cover. The cover material can be bonded to the case using an adhesive and/or mechanical fit. In another example, the cover 20 is formed from a sleeve sized to receive the case. The case can be positioned in the sleeve such that the sleeve surrounds the case. The sleeve bonded to the case using an adhesive and/or mechanical fit. In one example, the sleeve includes a shrinkwrap material. The case can be positioned in the sleeve such that the sleeve surrounds the case and the sleeve can be shrinkwrapped onto the case 10 such that the sleeve serves as the cover. The one or more quenching media can be mixed with the precursors for the support during formation of the cover material. Alternately, the support can be melted or liquefied and the one or more quenching media can be mixed into the melted or liquefied support before the support is solidified or re-solidified.

Figure 3A:
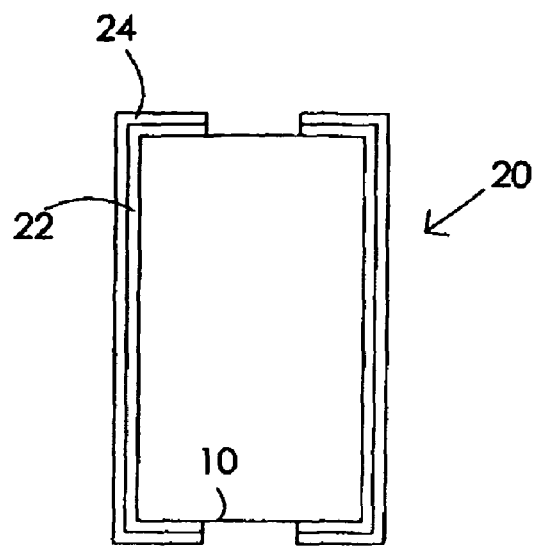
FIG. 3A is a cross-section of a battery system having a cover that includes a quenching layer having one or more quenching media laminated onto a support.

The one or more quenching media can be bonded to the support. For instance, a layer of material that includes the one or more quenching media can be bonded to the support. As an example, the one or more quenching media can be laminated to the support. For instance, FIG. 3A is a cross-section of a battery system having a cover 20 that includes a quenching layer 22 having one or more quenching media bonded onto a support 24. In one example, the support 24 includes or consists of a shrinkwrap material and the cover 20 is formed from a sleeve sized to receive the case. The case can be positioned in the sleeve such that the sleeve surrounds the case. The sleeve can then be shrinkwrapped onto the case 10 such that the sleeve serves as the cover. The quenching layer 22 can include one or more secondary support media in addition to the one or more quenching media or can consist of one or more quenching media.

Although FIG. 3A illustrates the quenching layer 22 between the support 24 and the battery, the support 24 can be positioned between the quenching layer 22 and the case 10. Alternately, the cover 20 can include a quenching layer between supports or can include a support between quenching layers. Additionally, in some instances, the support 24 can hold the quenching layer 22 on and/or against the case. In these instances, the quenching layer can be bonded to the support but need not be bonded to the support or even immobilized relative to the support.

Figure 3B:
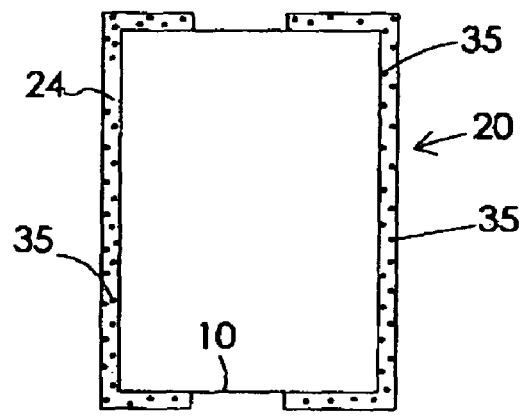
FIG. 3B is a cross-section of a battery system having a cover that includes a quenching medium dispersed in a support.

In one example, the quenching media 35 is dispersed in a support 24 as disclosed in FIG. 3B. For instance, the quenching medium 35 can be dispersed in a cloth such as a polyethylene cloth. The cloth can then serve as the cover or a second support can hold the cloth on the case. In the second instance, the cloth and the second support serve as the cover.

The cover 20 can be coated onto the case 10. A cover 20 that is coated on the case 10 can provide the advantage of being immobilized relative to the case 10. Additionally or alternately, a cover 20 that is coated on the case 10 can self-adhere to the case 10 so as to increase the contact between the coating and the case 10. A cover 20 that is coated on the case 10 can be formed from a solution that includes the one or more quenching media. The solution can be coated on the case 10 and then solidified so as to leave the cover 20 on the case 10. In some instances, the solution is solidified by drying, cooling and/or evaporating one or more components of the solution. The solution can be entirely liquid or can be a combination of liquids and solids. Additionally, when the solution includes multiple liquids the liquids need not be soluble. In some instances, the solution is a suspension, a slurry, or a liquid. In some instances, the solution includes a solvent or a volatile liquid that can be evaporated so the coating can be dried on the case 10.

The cover 20 can include or consist of microcapsules. One or more of the quenching media can be included in the microcapsules. One or more quenching media in the microcapsules can be a liquid. Additionally or alternately, one or more quenching media in the microcapsules can be a solid. As a result, microcapsules are suitable for use with quenching media that are solids below the exothermic reaction failure temperature. A suitable average diameter for the microcapsules includes but is not limited to diameters greater than 2 µm, 50 µm, 300 µm, and/or less than 500 µm, 1 mm or 2 mm. The wall for the microcapsules can serve as a support. Suitable materials for the capsule wall include, but are not limited to melamine formaldehyde resin and/or non-formalin resins. Suitable quenching media for including in the microcapsules include, but are not limited to, parafin. Suitable methods for generating the microcapsules include physical methods such as pan coating, air-suspension coating, centrifugal extrusion, and spray-drying; chemical methods such as interfacial polymerization, in-situ polymerization, and matrix polymerization.

In some instances, the cover 20 includes microcapsules and a support between the microcapsules. The support can serve as a binder that binds the microcapsules together and/or adheres the microcapsules to the case 10. In addition to the one or more quenching media inside the microcapsules, one or more of the quenching media can be mixed with the support between the microcapsules. A suitable support between the microcapsules includes, but is not limited to, polymers, ceramics, and metals.

A cover 20 that includes or consists of microcapsules can be coated onto the case. For instance, the cover can be formed from a solution that includes the microcapsules. The solution can be coated on the case 10 and solidified such that a coating that includes or consists of the microcapsules remains on the case 10. In some instances, the solution is solidified by drying, cooling and/or by evaporating one or more components of the solution. The solution can be entirely liquid or can be a combination of liquids and solids. Additionally, when the solution includes multiple liquids, the liquids need not be soluble. In some instances, the solution is a suspension, a slurry, or a liquid. In some instances, the solution includes a solvent or a volatile liquid that can be evaporated so the coating can be dried on the case 10. A cover 20 that is coated on the case 10 can provide the advantage of being immobilized relative to the case 10 and/or providing more intimate contact between the coating and the case 10.

Figure 4:
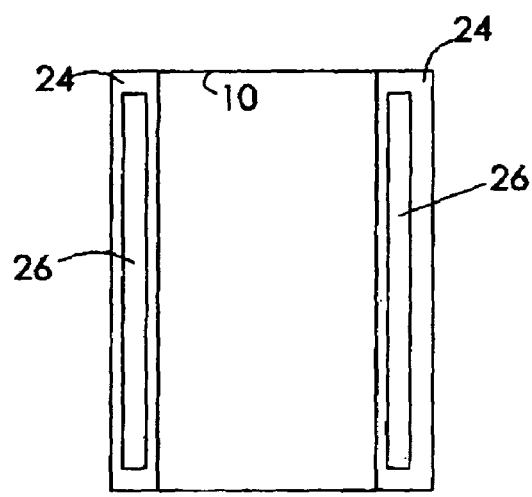
FIG. 4 is a cross-section of a battery system having a cover that includes a closed pocket. A solution that includes or consists of one or more quenching media can be positioned in the pocket.

In some instances, the cover 20 includes a support 24 having one or more pockets 26. The pockets 26 can be open pockets 26 have one or more regions that are open to the atmosphere or closed pockets 26 that are closed to the atmosphere. The one or more pockets 26 can contain a solid and/or a solution. The solid or the solution can include or consist of one or more of the quenching media. The solution can be entirely liquid or can be a combination of liquids and solids. Additionally, when the solution includes multiple liquids the liquids need not be soluble. In some instances, the solution is a suspension, a slurry, or a liquid. In some instances, the one or more pockets 26 are closed pockets 26 that contain a solution that includes or consists of one or more of the quenching media. For instance, FIG. 4 is a cross section of a cover 20 that includes a closed pocket 26. The pocket 26 can surround the case 10 or extend part way around the case 10. A solution that includes or consists of one or more quenching media can be positioned in the pocket 26. As a result, a cover 20 having one or more pockets 26 is suitable for use with quenching media that are liquids at temperatures below the exothermic reaction temperature. Suitable materials for use as the support include, but are not limited to, polymers, ceramics, and metals.

Although the pocket disclosed in the context of FIG. 4 is disclosed as a closed pocket, in some instances, the support defines only a portion of the closed pocket. For instance, the case 10 can define one or more sides of the pocket. For instance, the support can define three sides of the pocket 26 shown in FIG. 4 and the case can serve as the fourth side of the pocket 26. In some instances where a case defines a portion of the pocket, the support can effective hold the medium in the pocket against the case.

Example 1

A Sanyo 18650 lithium-ion cell was obtained and a nail penetration test was performed. The nail penetration test resulted in thermal runaway.

Figure 5:
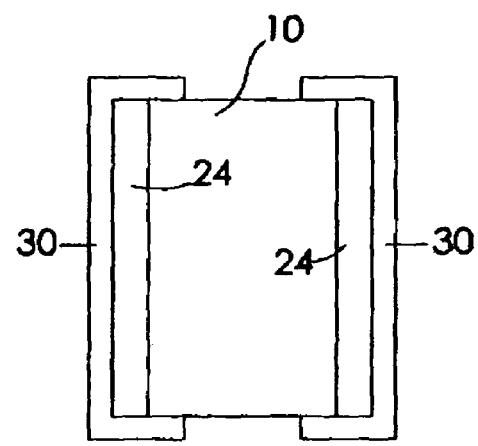
FIG. 5 illustrates a battery system having a quenching medium dispersed in a first support and a second support holding the first support on the case of a battery.

A powder was obtained that includes microcapsules with a melamine formaldehyde wall that encapsulates paraffin and has a 32° C. phase transition temperature (PMCD-32SP, Mikiriken Industrial Co., Ltd. of Japan). The microcapsules were dispersed into a 300 mm polypropylene cloth that serves as a first support 24 and was applied to the outside of a Sanyo 18650 lithium-ion cell. A polyethylene insulating cover that serves as a second support 30 was positioned over the cloth to provide the cell illustrated in FIG. 5. Accordingly, the polypropylene cloth and the insulating cover combined to form the cover. The cell was overcharged to 4.4 V and a nail penetration test was performed. The presence of the cover alleviated the thermal runaway.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A battery, comprising:
a case having an interior holding an electrolyte activating one or more anodes and one or more cathodes;
a cover on an exterior of the case such that the case is positioned between the cover and the interior of the case, the cover including a quenching layer between the case and a support layer, the quenching layer including one or more quenching media dispersed in a first support,
each quenching medium having a phase transition that occurs at a temperature above a exothermic reaction temperature of the battery and below the failure temperature of the battery,
the exothermic reaction temperature being the temperature at which a chain reaction associated with thermal runaway is initiated, and
the failure temperature of the battery being the temperature of the battery at which the thermal runaway causes failure of the battery.

2. The battery of claim 1, wherein at least one quenching medium has a phase transition that occurs between 25° C. and 150° C.

3. The battery of claim 1, wherein at least one quenching medium is selected from a group consisting of parafin, polyethylene, silver nitrate and indium metal.

4. The battery of claim 1, wherein at least one quenching medium dispersed in the first support is a liquid at a temperature below exothermic reaction temperature and transitions from the liquid to a vapor at a temperature above the exothermic reaction temperature of the battery and below the failure temperature of the battery.

5. The battery of claim 1, wherein at least one quenching medium is a solid at a temperature below the exothermic reaction temperature and transitions from the solid to a liquid at a temperature above the exothermic reaction temperature of the battery and below the failure temperature of the battery.

6. The battery of claim 1, wherein at least one quenching medium is a solid at a temperature below the exothermic reaction temperature and sublimes from the solid to a vapor at a temperature above the exothermic reaction temperature of the battery and below the failure temperature of the battery.

7. The battery of claim 1, wherein the cover surrounds the case.

8. The battery of claim 1, wherein the support layer includes one or more support materials that include one or more media that do not have a phase transition between the exothermic reaction temperature and the failure temperature.

9. The battery of claim 1, wherein microcapsules are dispersed in the first support and at least one of the quenching media is contained in the microcapsules.

10. The battery of claim 1, wherein the first support includes a cloth and the one or more quenching media are dispersed in the cloth.

11. The battery of claim 10, wherein the cloth is a polyethylene cloth.

12. The battery of claim 10, wherein the support layer holds the quenching layer against the case.

13. The battery of claim 10, wherein the cover includes microcapsules dispersed in the cloth and at least one of the quenching media is contained in the microcapsules.

14. A battery, comprising:
a case having an interior holding an electrolyte activating one or more anodes and one or more cathodes;
a cover on an exterior of the case such that the case is positioned between the cover and the interior of the case, the cover including a quenching layer between the case and a support layer, the quenching layer including one or more quenching media dispersed in a first support,
each quenching medium having a phase transition that occurs at a temperature above a exothermic reaction temperature of the battery and below the failure temperature of the battery,
the exothermic reaction temperature being the temperature at which a chain reaction associated with thermal runaway is initiated, and
the failure temperature of the battery being the temperature of the battery at which the thermal runaway causes failure of the battery,
the cover including one or more shrinkwrap materials and the cover being shrinkwrapped onto the case.

15. The battery of claim 14, wherein the cover surrounds the case without covering terminals on opposing ends of the case.

16. The battery of claim 14, wherein the cover is coupled to the case in accordance with the case being received in the cover and the cover being heated so as to shrink the cover into contact with the case.

* * * * *